Oct. 14, 1924.  L. S. MOORE  1,511,818
VEHICLE TESTING MECHANISM
Filed May 20, 1922    2 Sheets-Sheet 1
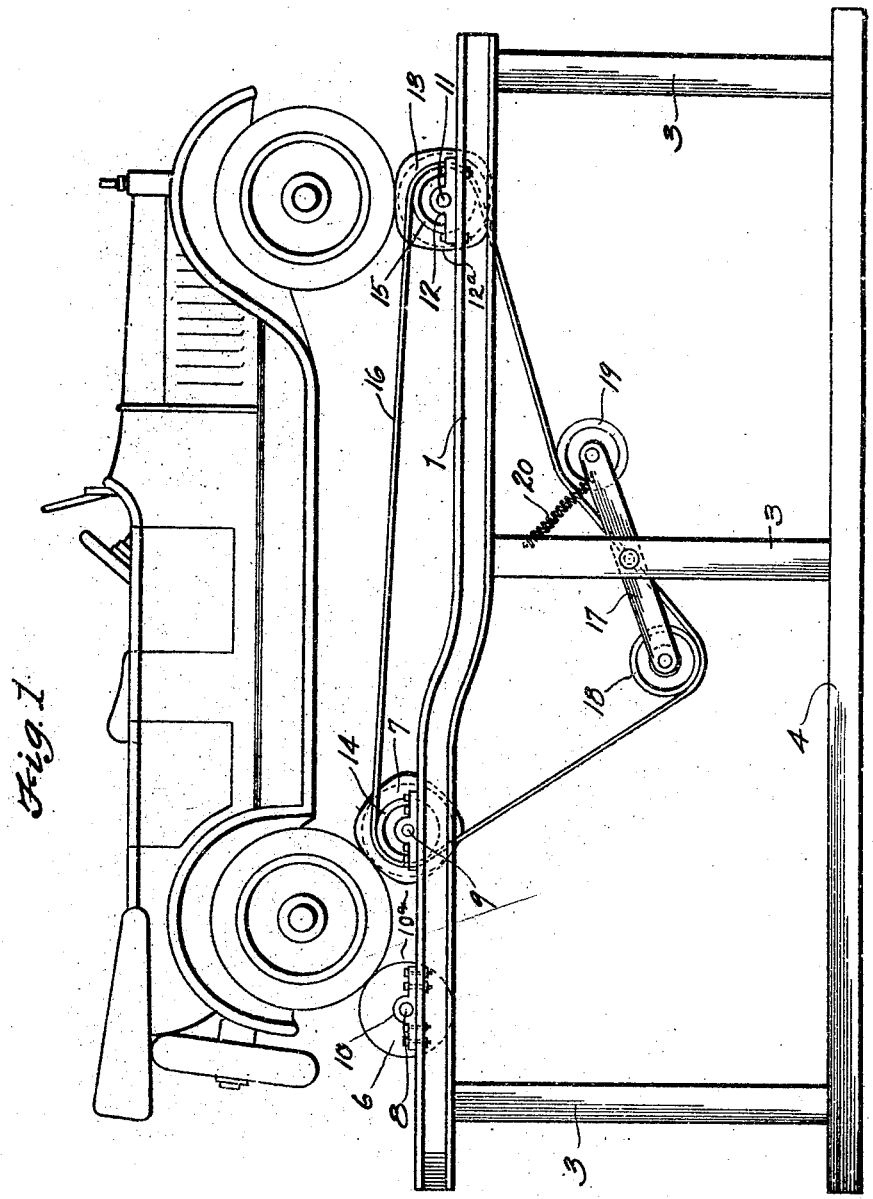
Inventor
LELAND S. MOORE
By Attorney
Richard J. Cook

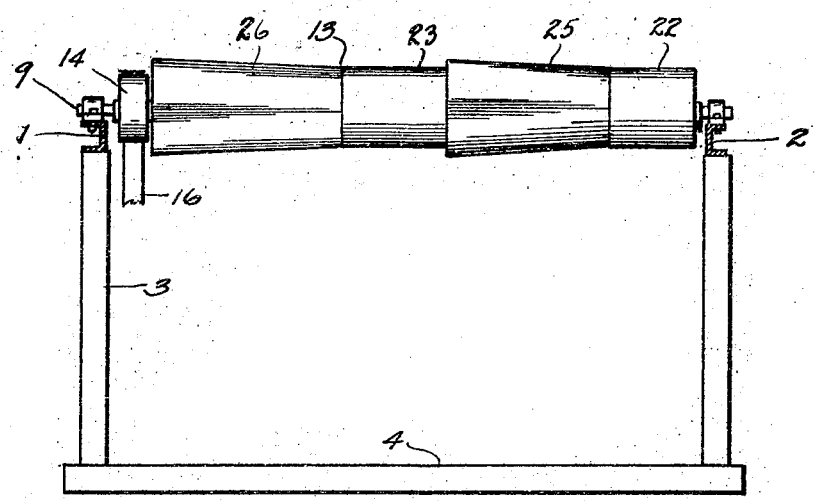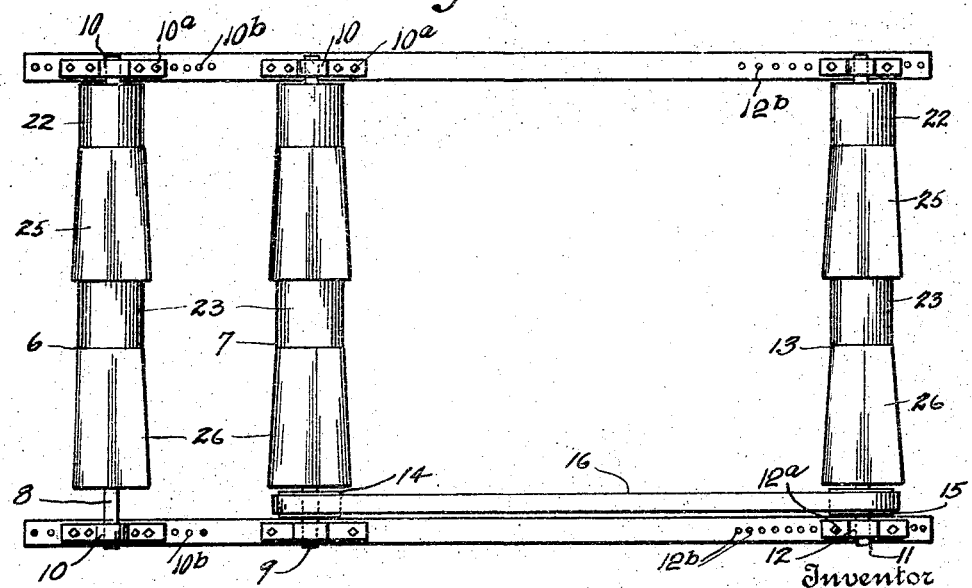

Patented Oct. 14, 1924.

1,511,818

UNITED STATES PATENT OFFICE.

LELAND S. MOORE, OF TACOMA, WASHINGTON.

VEHICLE TESTING MECHANISM.

Application filed May 20, 1922. Serial No. 562,439.

*To all whom it may concern:*

Be it known that I, LELAND S. MOORE, a citizen of the United States, and a resident of Tacoma, county of Pierce, and State of Washington, have invented certain new and useful Improvements in Vehicle Testing Mechanism, of which the following is a specification.

This invention relates to motor vehicle testing mechanism, and more particularly it relates to a device for artificially producing road shock and vibration in a vehicle in order that a workman may locate any looseness, rattle, squeak or any other undesirable feature which can be located in this way.

Heretofore it has been the custom in testing for squeaks, knocks, or other defects to drive the car along a rough road, with the mechanic placing himself in positions where he could best hear, but this method is entirely unsatisfactory since the mechanic cannot get beneath the car, nor can he hear very well due to the noise of the engine and vehicle.

It has therefore been the object of this invention to provide a supporting structure on which a vehicle to be tested may be located and held in such position that a mechanic, or one doing the testing, may work advantageously beneath the vehicle, and which includes mechanism whereby all the shock and vibration that a vehicle is subjected to by travel on a rough road may be artificially produced so that any looseness of parts, squeaks, rattles and knocks may be readily located and remedied.

It is a further object of the invention to provide a device of the above character wherein means is provided for varying the degree of vibration produced so that it can be made to be very slight or excessive.

Other objects of the invention reside in the details of construction of the different parts of the device and in their combination and mode of operation.

In accomplishing these and other objects of the invention, I have provided the improved details of construction, the preferred forms of which are illustrated in the accompanying drawings, wherein—

Figure 1 is a side view of a device embodied by the present invention; showing a vehicle mounted thereon for testing.

Figure 2 is a transverse sectional view of the same.

Figure 3 is a plan view of the testing structure, particularly illustrating the disposition of the vehicle supporting rollers and their construction.

Referring more in detail to the several views of the drawings—

1 and 2 designate opposite side rails, supported horizontally and in parallel relation at a suitable working height by means of vertical posts 3 disposed on base beams 4. Corresponding ends of the beams 1 and 2, being designated as the rearward ends, are offset above the horizontal level of the forward portions in order that, as will presently be apparent, the vehicle being tested will be maintained on a level.

Mounted in spaced apart, parallel relation, transversely of the frame at its rearward end, are two rollers 6 and 7. These have supporting axles 8 and 9, respectively, rotatably mounted in bearings 10 that are fixed by bolts $10^a$ upon the beams 1 and 2. To accommodate wheels of different diameters, I have provided for adjustment longitudinally of the frame of the supporting bearings of the roller 6 to enable this roller to be brought closer or moved farther from the roller 7. For this purpose the beams 1 and 2 are provided with a series of apertures $10^b$ for receiving the bolts $10^a$ whereby the bearings will be held after adjustment.

Likewise there is a roller 13 mounted across the forward end of the frame, having an axle 11 supported rotatably at its ends in bearing blocks 12 which may be secured at different positions of adjustment by extending their anchor bolts $12^a$ through apertures $12^b$ in the beams. Such adjustment being required for testing vehicle having different wheel base.

There are belt wheels 14 and 15 respectively fixed on the axles 9 and 11 about which a belt 16 is extended; the belt being held taut by means of a tightener comprising an arm 17 that is centrally pivoted on a post 4 and has pulleys 18 and 19 at its ends engaging with opposite sides of the belt, and a spring 20 is fixed to the post and to the arm in such position as to retain the pulleys tightly against the belt and the belt tightened about the wheels 14 and 15.

One of the important features of the invention resides in the construction of the rollers 6, 7 and 10 whereby there may be a variation in the degree of vibration or shock produced in a vehicle being tested.

Between corresponding points on each roller there are formed perfectly cylindrical surfaces, co-axial with the axles of the rollers. As is best shown in Figure 3 the cylindrical surfaces, designated at 22 and 23 are at the ends at the right and about the middle points of the rollers and are spaced apart a distance equal to the distance between the paired wheels of the vehicle, that is, the width of an ordinary roadway. Between these surfaces, and toward the ends at the left, the rollers have gradually increasing ridged surfaces, as designated at 25 and 26, the degree of irregularity increasing toward the left hand ends of the rollers, as shown in Figure 2, and having a tendency toward being square in cross section.

Assuming that the device is so constructed, in using the same for testing a vehicle the transverse rollers are first adjusted to proper position according to the length, or wheel-base of the vehicle, and so that when the vehicle is placed thereon, as is shown in Figure 1, the rearward wheels will be supported between and upon the two transverse, rearward rollers and the forward, steering, wheels of the vehicle will be supported centrally upon the forward rollers. The vehicle is placed in position by any suitable means and is first disposed upon the cylindrical surfaces of the rollers. The motor of the vehicle is then started to drive the rearward wheels and this will cause rotation of the rearward supporting rollers and, by means of belt connection, will also rotate the forward rollers. A person in the driver's position may then, by turning the steering wheel, adjust the front wheels so that they will follow toward the left and this will cause shifting of the vehicle from the cylindrical position of the rollers onto the irregular surfaces and, due to this irregularity, there will be caused vibration which may be increased or decreased accordingly as desired by causing the vehicle to move toward the left or right; it being apparent that if the wheels are supported on the most irregular part of the rollers, there will be an intense vibration produced. It is apparent then that a mechanic stationed beneath the supporting frame, or beneath the vehicle, will be in position to locate and adjust any looseness of parts, rattles or knocks that will be brought out by the artificially produced road shock.

It is further apparent that a construction of this character is very advantageous over the ordinary method of testing for looseness, squeaks or rattles, since it does not require that the vehicle be taken from the shop, and provides that the workmen may position themselves in the most advantageous places to locate any defects.

It is further apparent that various changes in construction and mode of operation could be made in the device as shown without departing from the spirit of the invention. For this reason, it is not desired that the construction be limited only to the details herein illustrated.

What I claim as new and desire to secure by Letters-Patent, is:

1. A vehicle testing device of the class described, comprising a frame structure, rollers having surfaces that vary radially with varying longitudinal positions, mounted within the frame in spaced relation, upon which a vehicle may be supported, and means associated with the rear roller for revolving the forward rollers whereby a varying degree of vibration can be produced under the control of the steering mechanism of said vehicle.

2. A device of the class described, comprising a frame structure, a pair of rearward rollers and a forward roller mounted rotatably in the frame; said paired rollers being spaced apart to receive between them and to support the driving wheels of an automobile or the like thereon, and said forward roller being adapted to support the forward wheels of the vehicle; said rollers having surfaces that vary radially with varying longitudinal position and means whereby the forward roller may be driven from a rearward roller.

3. A device of the class described, comprising a frame structure having opposite side rails, a pair of rearward rollers mounted rotatably in parallel relation between the side rails, one of said rollers being adjustable from and toward the other, a forward roller mounted transversely of the frame and adjustable toward or from the rearward rollers; all of said rollers having cylindrical surfaces at corresponding points for the support of a vehicle thereon and having irregular surfaces; said rearward rollers being adapted to receive between them and to support the driving wheels of a vehicle and said forward roller being adjustable and adapted to support the forward wheels of the vehicle, belt wheels fixed to the forward and to a rearward roller, and a belt extended about said wheels whereby the forward roller may be driven from the rearward.

Signed at Seattle, Washington, this 15th day of May 1922.

LELAND S. MOORE.